(12) United States Patent
Gwak et al.

(10) Patent No.: US 11,131,856 B2
(45) Date of Patent: Sep. 28, 2021

(54) HEAD-MOUNTED DISPLAY

(71) Applicant: BHAPTICS INC., Daejeon (KR)

(72) Inventors: Kiuk Gwak, Daejeon (KR); Younghun Ko, Daejeon (KR); Wonho Yu, Daejeon (KR)

(73) Assignee: BHAPTICS INC., Daejeon (KR)

( * ) Notice: Subject to any disclaimer, the term of this patent is extended or adjusted under 35 U.S.C. 154(b) by 0 days.

(21) Appl. No.: 16/621,147

(22) PCT Filed: Jun. 12, 2018

(86) PCT No.: PCT/KR2018/006674
§ 371 (c)(1),
(2) Date: Dec. 10, 2019

(87) PCT Pub. No.: WO2018/230951
PCT Pub. Date: Dec. 20, 2018

(65) Prior Publication Data
US 2020/0124860 A1    Apr. 23, 2020

(30) Foreign Application Priority Data
Jun. 13, 2017    (KR) ........................ 10-2017-0074421

(51) Int. Cl.
*G02B 27/01*    (2006.01)
*G06F 3/01*    (2006.01)

(52) U.S. Cl.
CPC .......... *G02B 27/0176* (2013.01); *G06F 3/011* (2013.01); *G06F 3/016* (2013.01); *G02B 2027/0161* (2013.01)

(58) Field of Classification Search
CPC .... G02B 2027/0154; G02B 2027/0156; G02B 2027/0161; G02B 2027/0163; G02B 27/01; G02B 27/017; G02B 27/0176; G02B 27/0178; G02B 2027/0192; G06F 3/01; G06F 3/011; G06F 3/016; G06F 1/163; G06F 1/3231; G06F 1/3265; Y02D 10/00; Y02D 30/50
See application file for complete search history.

(56) References Cited

U.S. PATENT DOCUMENTS

| | | |
|---|---|---|
| 5,986,813 A | 11/1999 | Saikawa et al. |
| 8,920,174 B2 | 12/2014 | Tachi et al. |
| 2010/0110368 A1* | 5/2010 | Chaum ................. G02C 11/10 351/158 |

(Continued)

FOREIGN PATENT DOCUMENTS

| | | |
|---|---|---|
| CN | 103988113 A | 8/2014 |
| CN | 105388614 A | 3/2016 |

(Continued)

OTHER PUBLICATIONS

"VR Cover", URL: https://vrcover.com/shop.
(Continued)

*Primary Examiner* — Kenneth Bukowski
(74) *Attorney, Agent, or Firm* — IP & T Group LLP

(57) ABSTRACT

A head mounted display in accordance with an embodiment of the present invention includes: a display capable of displaying an image; a buffer extending along an outer edge of the display; and a plurality of actuators located along a direction in which the buffer extends.

5 Claims, 16 Drawing Sheets

(56) References Cited

U.S. PATENT DOCUMENTS

| | | | |
|---|---|---|---|
| 2014/0064536 A1* | 3/2014 | Kim | H04R 5/033 |
| | | | 381/333 |
| 2015/0123774 A1 | 5/2015 | Ioffreda et al. | |
| 2015/0234189 A1* | 8/2015 | Lyons | G02B 27/0093 |
| | | | 345/174 |
| 2015/0268673 A1* | 9/2015 | Farzbod | H04R 1/1008 |
| | | | 700/280 |
| 2016/0109713 A1* | 4/2016 | Osterhout | G06F 3/016 |
| | | | 359/630 |
| 2016/0192048 A1* | 6/2016 | Dong | H04R 1/028 |
| | | | 381/334 |
| 2017/0010471 A1 | 1/2017 | Serrano Canovas et al. | |
| 2017/0168303 A1* | 6/2017 | Petrov | G02B 27/0176 |
| 2017/0266676 A1* | 9/2017 | Fateh | A63F 13/5255 |
| 2018/0098465 A1* | 4/2018 | Reynolds | G02B 27/028 |
| 2018/0307282 A1* | 10/2018 | Allin | G06F 1/20 |
| 2019/0204919 A1 | 7/2019 | Gwak et al. | |
| 2019/0286236 A1 | 9/2019 | Gwak et al. | |
| 2019/0354161 A1* | 11/2019 | Li | G06F 1/3231 |
| 2019/0377191 A1* | 12/2019 | Hughes | G06K 9/00617 |

FOREIGN PATENT DOCUMENTS

| | | |
|---|---|---|
| CN | 105866954 A | 8/2016 |
| JP | 10-065996 A | 3/1998 |
| JP | 11-203040 | 7/1999 |
| JP | 2000-210468 | 8/2000 |
| JP | 2012-186684 A | 9/2012 |
| JP | 2014-519791 | 8/2014 |
| JP | 2014-194767 A | 10/2014 |
| JP | 2017-068105 | 4/2017 |
| KR | 10-2013-0031423 | 3/2013 |
| KR | 10-2014-0078237 | 6/2014 |
| KR | 10-1561671 | 10/2015 |
| KR | 10-2016-0026557 | 3/2016 |
| KR | 10-2016-0068060 | 6/2016 |
| KR | 10-2017-0031978 | 3/2017 |
| KR | 10-2017-0058756 | 5/2017 |
| WO | 2007/066717 | 6/2007 |
| WO | 2014/147946 A1 | 9/2014 |
| WO | 2016/170717 A1 | 10/2016 |
| WO | 2017/043610 A1 | 3/2017 |
| WO | 2017/164480 | 9/2017 |
| WO | 2018/230790 | 12/2018 |
| WO | 2018/230949 | 12/2018 |

OTHER PUBLICATIONS

"Coin Vibration Motors", Precision Microdrives, URL: https://www.precisionmicrodrives.com/vibration-motors/coin-vibration-motors/.
Materials published on Mar. 20, 2018, Korean game technology aims the global market, URL: https://www.invenglobal.com/articles/4647/korean-game-technology-aims-the-global-market.
Materials published on Mar. 20, 2018, Korean Wave (Hallyu) of Digital Games Knocks on the North America's Door . . . 'Robot Taekwon V VR' Will Be Displayed in GDC in the U.S.
Information Materials of GDC Expo 2018 including a photo taken at the time and Exhibitor List.
"Surround Haptics and Tactile Brush", URL: http://ndagallery.cooperhewitt.org/gallery/16275499/Surround-Haptics-and-Tactile-Brush.
This Young Startup Built a Futuristic Vest That Could Help Deaf People Hear, URL:https://www.mic.com/articles/126656/vest-braille-apparel-kickstarter-helps-deaf-people-hear.
Piateski, E. et al., "Vibrotactile Pattern Recognition on the Arm and Torso", Proceedings of the First Joint Eurohaptics Conference and Symposium on Haptic Interfaces for Virtual Environment and Teleoperator Systems, IEEE, Mar. 2005.
Office Action issued by the Japan Patent Office dated Dec. 8, 2020.
Extended European Search Report issued by the European Patent Office dated Mar. 12, 2021.
Office Action issued by the Chinese Patent Office dated Mar. 30, 2021.

* cited by examiner

HEAD-MOUNTED DISPLAY

This application is a national stage application of PCT/KR2018/006674 filed on Jun. 12, 2018, which claims priority of Korean patent application number 10-2017-0074421 filed on Jun. 13, 2017. The disclosure of each of the foregoing applications is incorporated herein by reference in its entirety.

TECHNICAL FIELD

The present invention relates to a head mounted display.

BACKGROUND ART

A head mounted display may be worn around a head of a user to provide images corresponding to a left eye and a right eye of the user. Accordingly, the user experience as if the user actually exists in virtual reality.

The head mounted display is closely related to virtual reality, augmented reality, etc., to be used in various fields such as entertainments, games, military affairs, and medical treatments.

However, in order for a user to more realistically experience virtual reality, it is necessary to provide the user with senses corresponding to other senses in addition to a sense of sight.

DISCLOSURE

Technical Problem

The present invention is conceived to solve the aforementioned problems. Accordingly, an object of the present invention is to provide a head mounted display for providing a tactile stimulation.

Technical Solution

In accordance with an aspect of the present invention, there is provided a head mounted display including: a display capable of displaying an image; a buffer extending along an outer edge of the display; and a plurality of actuators located along a direction in which the buffer extends.

The head mounted display may further include an actuator supporting cover supporting the plurality of actuators, the actuator supporting cover covering at least a portion of the buffer.

The actuator supporting cover may include: a base band at which the plurality of actuators are located; and an auxiliary band located to overlap with a region in which the plurality of actuators are located among regions of the base band, wherein a portion of outer edge thereof connected to the base band.

The base band may include a protrusion part that does not overlap with the auxiliary band. The head mounted display may further include: a first detachable member located on a rear surface of the protrusion part; and a second detachable member located on a rear surface of the auxiliary band, the second detachable member being detachable from the first detachable member.

The plurality of actuators may be located to a front surface of the base band. The head mounted display may further include: a plurality of top cases located on the front surface of the base band, the plurality of top cases covering the plurality of actuators; and a plurality of bottom cases located on a rear surface of the base band, the plurality of bottom cases being coupled to the plurality of top cases.

The plurality of actuators may be located on a front surface of the buffer. The head mounted display may further include: a plurality of top cases located on the front surface of the buffer, the plurality of top cases covering the plurality of actuators; and a plurality of bottom cases coupled to the plurality of top cases to allow the plurality of actuators to be fixed to the buffer.

The plurality of actuators may be located at the inside of the buffer. The head mounted display may further include: a plurality of top cases located at the inside of the buffer, the plurality of top cases covering the plurality of actuators; and a plurality of bottom cases coupled to the plurality of top cases to allow the plurality of actuators to be fixed to the buffer.

The head mounted display may further include a buffer cover supporting the plurality of actuators, the buffer cover covering the buffer.

The plurality of actuators may be located on a front surface of the buffer cover. The head mounted display may further include: a plurality of top cases located on the front surface of the buffer cover, the plurality of top cases covering the plurality of actuators; and a plurality of bottom cases coupled to the plurality of top cases to allow the plurality of actuators to be fixed to the buffer cover.

The plurality of actuators may be located at the inside of the buffer cover. The head mounted display may further include: a plurality of top cases located at the inside of the buffer cover, the plurality of top cases covering the plurality of actuators; and a plurality of bottom cases coupled to the plurality of top cases to allow the plurality of actuators to be fixed to the buffer cover.

Advantageous Effects

The head mounted display in accordance with the present is invention can provide a tactile stimulation.

MODE FOR THE INVENTION

Figure 1:
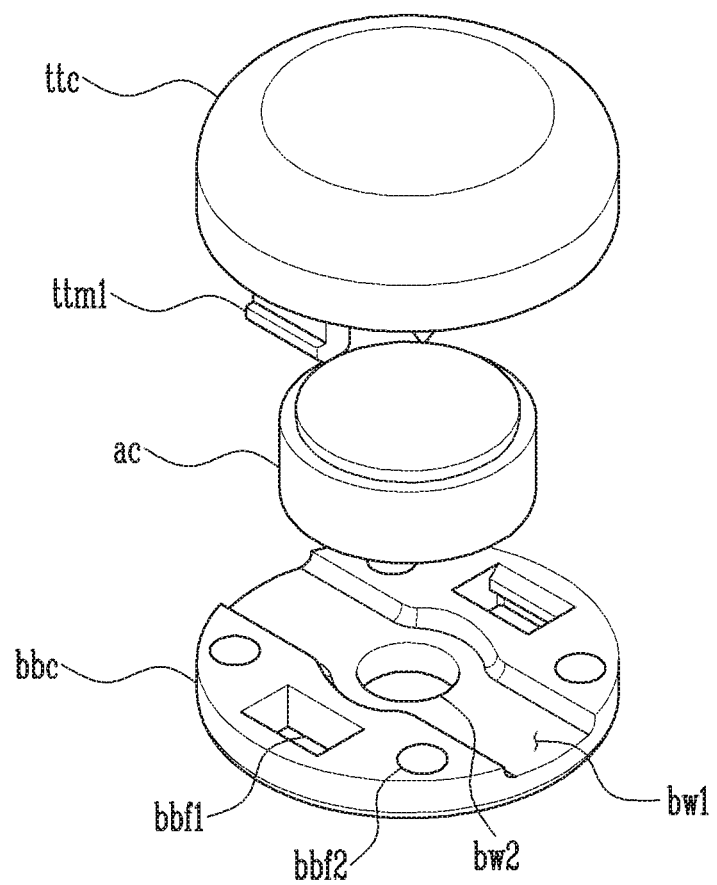
FIG. 1 is a view illustrating an actuator case at a point of view in accordance with an embodiment of the present invention.

Hereinafter, exemplary embodiments are described in detail with reference to the accompanying drawings so that those skilled in the art may easily practice the present invention. The present invention may be implemented in various different forms and is not limited to the exemplary embodiments described in the present specification.

A part irrelevant to the description will be omitted to clearly describe the present invention, and the same or similar constituent elements will be designated by the same reference numerals throughout the specification. Therefore, the same reference numerals may be used in different drawings to identify the same or similar elements.

In addition, the size and thickness of each component illustrated in the drawings are arbitrarily shown for better understanding and ease of description, but the present invention is not limited thereto. Thicknesses of several portions and regions are exaggerated for clear expressions.

Figure 2:
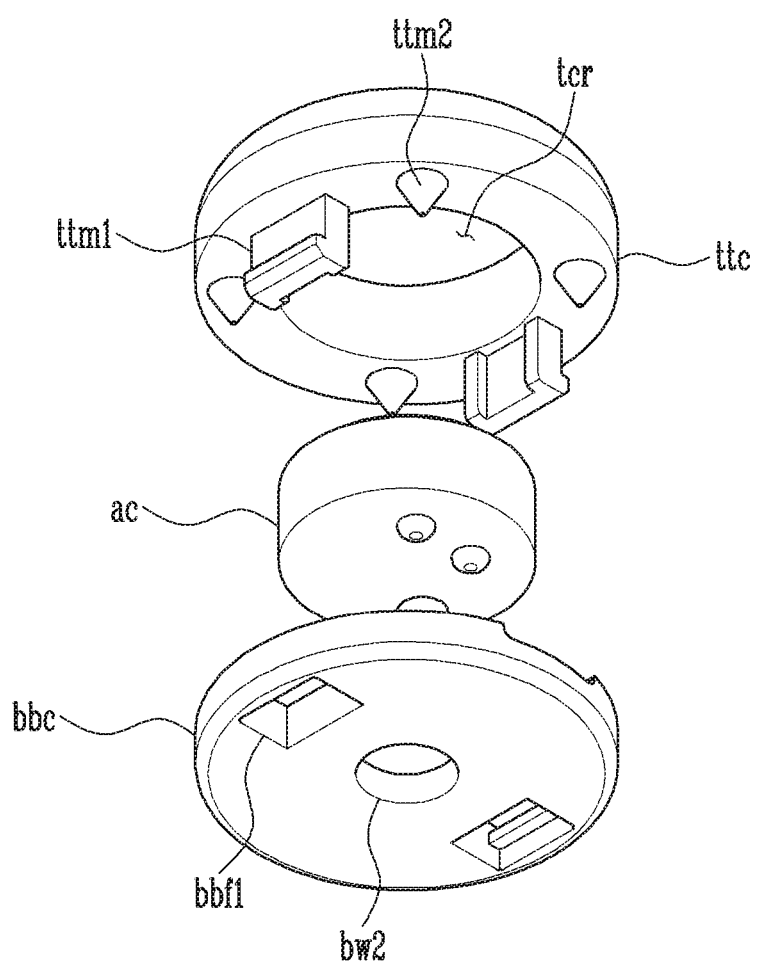
FIG. 2 is a view illustrating the actuator case shown in FIG. 1 at another point of view.

FIG. 1 is a view illustrating an actuator case at a point of view in accordance with an embodiment of the present invention and FIG. 2 is a view illustrating the actuator case shown in FIG. 1 at another point of view.

Referring to FIGS. 1 and 2, the actuator case corresponding to one actuator ac may include a top case ttc and a bottom case bbc. The actuator ac may be a vibration motor that is one of electric actuators. For example, the actuator ac may be a coin motor. Hereinafter, a case where the actuator ac is a vibration motor is described as an example, but the actuator ac may be a pneumatic or hydraulic actuator. Therefore, one kind or plural kinds of actuators may be applied to the present invention. In embodiments which will be described later, some of a plurality of actuators may be replaced with a pressure sensor, a temperature sensor, etc., to sense information of a user.

Although not shown in the drawings, a base band may be an arbitrary plate-shaped support interposed between the actuator ac and the bottom case bbc. The material of the base band is not limited. In accordance with an embodiment of the present invention, the base band may be made of a flexible material such as cloth, rubber, urethane, silicon, or plastic. In each embodiment, a layer constituting the base band may be differently defined.

The top case ttc may include an actuator accommodation part tcr for accommodating the actuator ac. Thus, the actuator ac is disposed closer to the top case ttc, so that a vibration of the actuator ac can be better propagated to a user.

The top case ttc may include a male fastening part ttm1 and a projection ttm2, and the bottom case bbc may include a female fastening part bbf1 and a recessed part bbf2. The base band may include an opening corresponding to the male fastening part ttm1. The male fastening part ttm1 may be coupled to the female fastening part bbf1 through the opening of the base band. The projection ttm2 is fitted into the recessed part bbf2 while pressurizing the base band, so that the actuator case can be more stably fixed to the base band.

The bottom case bbc may include line passages bw1 and bw2. A signal transmission member may electrically connect the actuator ac to a controller through the line passages bw1 and bw2. The controller may be a dedicated controller of the actuator ac. However, the controller may be a self-controller of a head mounted display which will be described later, or be a remote controller.

The top case ttc and the bottom case bbc may be made of a rigid material such as plastic or metal. However, since the top case ttc may be in direct contact with a body of a user, the top case ttc may be made of a soft material such as urethane, silicon or rubber.

Figure 3:
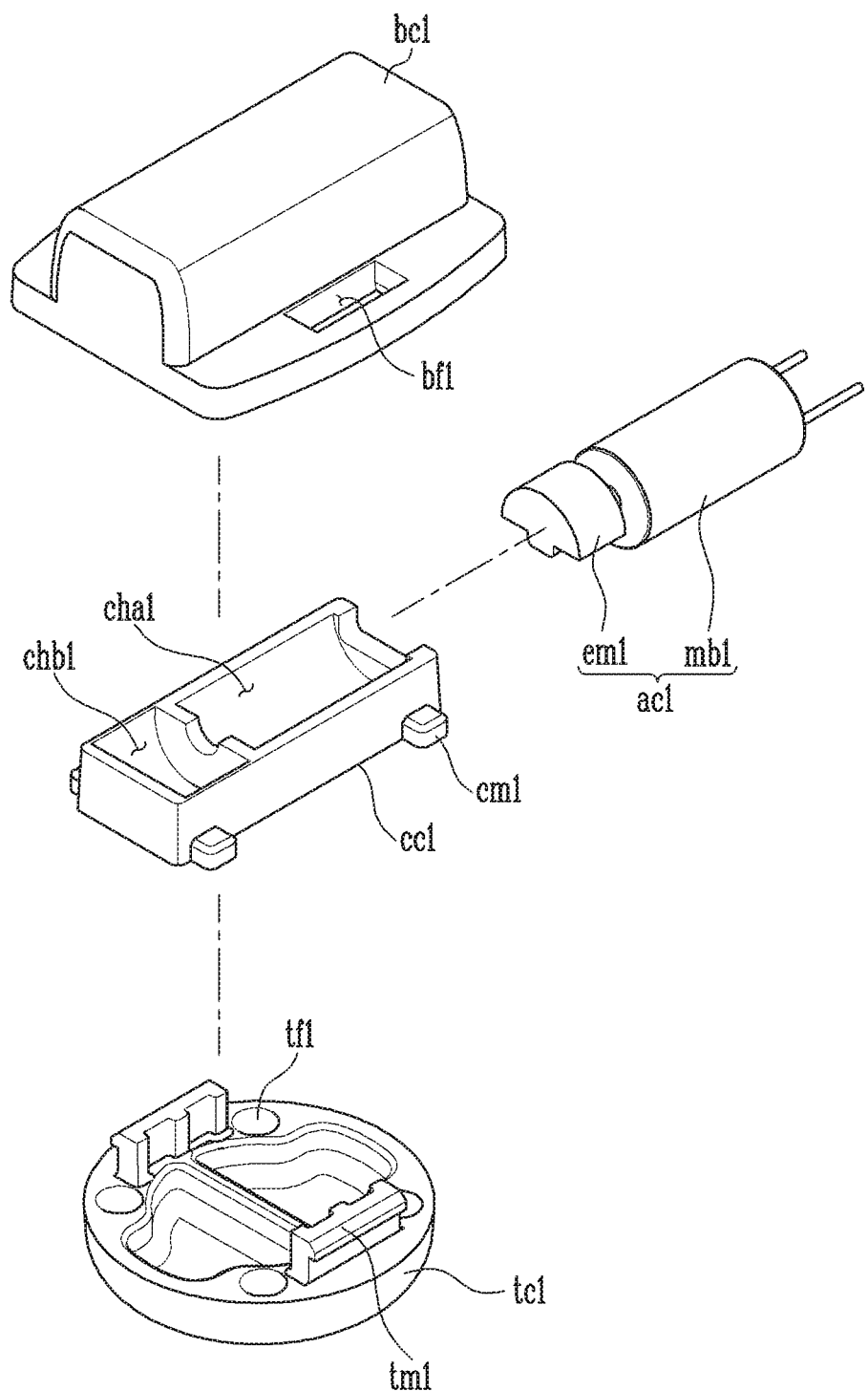
FIG. 3 is a view illustrating an actuator case at a point of view in accordance with another embodiment of the present invention.
Figure 4:
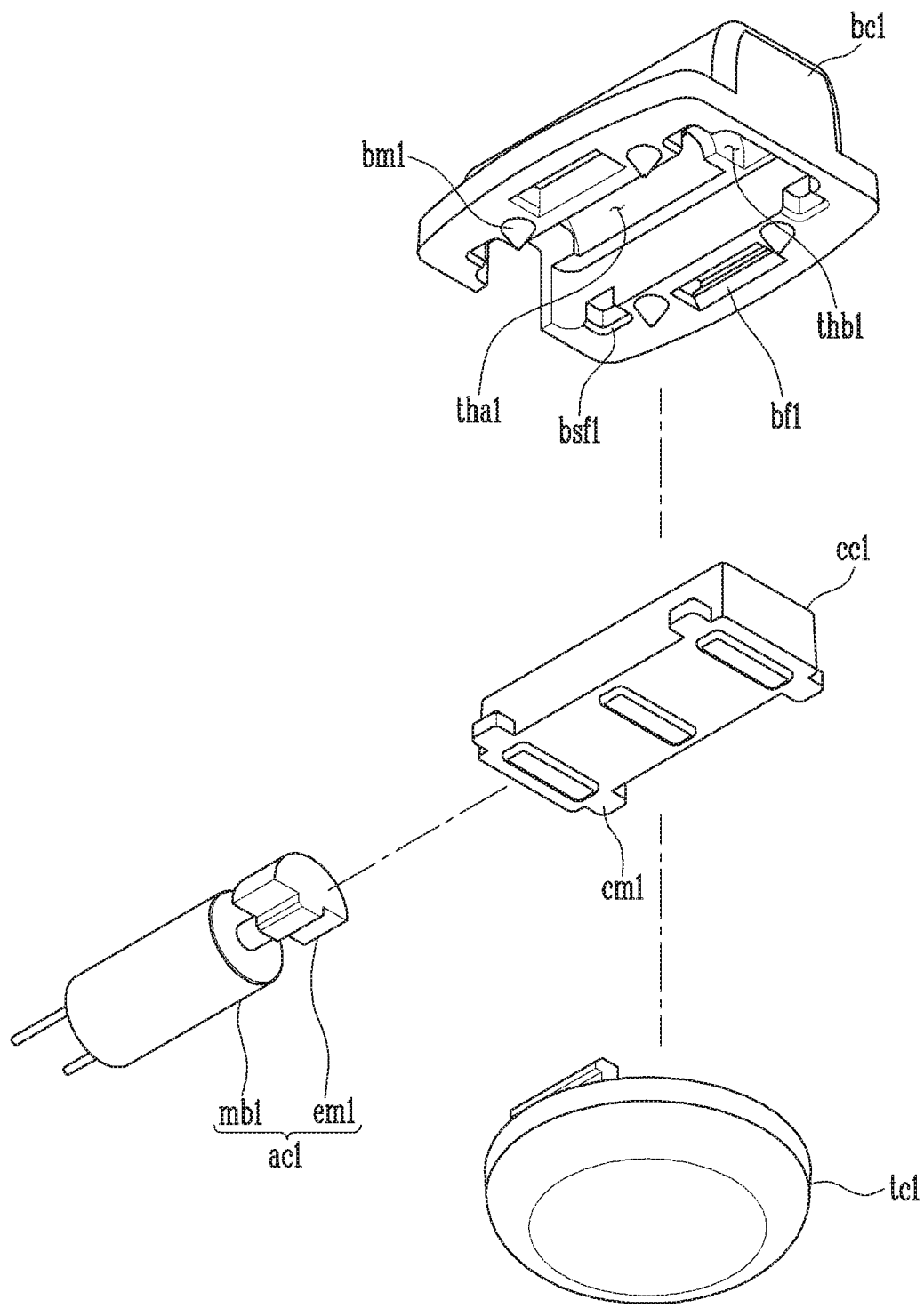
FIG. 4 is a view illustrating the actuator case shown in FIG. 3 at another point of view.

FIG. 3 is a view illustrating an actuator case at a point of view in accordance with another embodiment of the present invention and FIG. 4 is a view illustrating the actuator case shown in FIG. 3 at another point of view.

Referring to FIGS. 3 and 4, the actuator case in accordance with another embodiment of the present invention may include a bottom case bc1 and a cover case cc1, and a top case tc1.

A position relationship of the bottom case bc1, the cover case cc1, and the top case tc1 may be determined based on a base band. Although not shown in the drawings, the base band may be located between the cover case cc1 and the top case tc1. In each embodiment, a layer constituting the base band may be differently defined.

An actuator ac1 is located on one surface of the base band, and includes a driver mb1 and an eccentric mass em1. The driver mb1 and the eccentric mass em1 may be rotatably connected through a shaft. The actuator ac1 may be an eccentric rotation motor (ERM). The actuator ac1 may generate a vibration when the eccentric mass em1 rotated by the driver mb1 serves as an imbalanced vibrator. The actuator ac1 may be a cylindrical vibration motor that has a diameter of about 6 mm and has a total height of about 17 mm. While a coin-shaped motor generates a vibration in a horizontal direction when a vibrator is rotated horizontally, the actuator ac1 of this embodiment may generate a vibration in a vertical direction.

The bottom case bc1 is located on the one surface of the base band, and includes a first accommodation part tha1 for accommodating the driver mb1 and a second accommodation part thb1 for accommodating the eccentric mass em1. That is, the bottom case bc1 may accommodate the whole or a portion of the actuator ac1 except a line. In some embodiments, when the bottom case bc1 accommodates only a portion of the actuator ac1, the other portion of the actuator ac1 may be accommodated by the cover case cc1 which will be described later.

The cover case cc1 is located on the one surface of the base band, and is coupled to the bottom case bc1 to allow the driver mb1 to be adhered closely to the first accommodation part tha1.

Referring to FIGS. 3 and 4, the cover case cc1 may be coupled to the bottom case bc1 while covering the actuator ac1. A male fastening part cm1 of the cover case cc1 is fitted into a female fastening part bsf1 of the bottom case bc1, so that the cover case cc1 can be firmly fixed to the bottom case bc1. In particular, the first accommodation part tha1 and an accommodation part cha1 may be formed such that the driver mb1 of the actuator ac1 can be firmly fixed. The male fastening part cm1 of the cover case cc1 may protrude such that the cover case cc1 is parallel to the surface on which the cover case cc1 is in contact with the base band. In this embodiment, four pairs of the male fastening parts cm1 and the female fastening parts bsf1 are provided. However, in some embodiments, the number of the male fastening parts cm1 and the female fastening parts bsf1 may vary.

The cover case cc1 is coupled to the bottom case bc1, to form, along with the second accommodation part thb1, an extra rotating space of the eccentric mass em1 while allowing the eccentric mass em1 to be spaced apart from the one surface of the base band. That is, an accommodation part chb1 of the cover case cc1 is matched to the second accommodation part thb1, to form an extra rotating space that does not interfere with rotation of the eccentric mass em1. Also, the accommodation part chb1 of the cover case cc1 functions to allow the eccentric mass em1 to be spaced apart from the one surface of the base band. Thus, even when the base band is made of a flexible cloth or rubber material, the eccentric mass em1 can be reliably rotated without colliding with the base band.

The top case tc1 is located on the other surface of the base band, and allows the bottom case bc1 to be fixed to the base band.

A male fastening part tm1 of the top case tc1 penetrates the base band and is coupled to a female fastening part bf1, so that the actuator ac1 and the actuator case bc1, cc1, and tc1 can be fixed to the base band. The base band may include an opening having a shape through which the male fastening part tm1 can pass. In some embodiments, an area of the top case tc1 adhered closely to the other surface of the base band may be smaller than that of the bottom case bc1 adhered closely to the one surface of the base band. Since a space in which the male fastening part tm1 can be located is relatively insufficient, two pairs of the male fastening parts tm1 and the female fastening parts bf1 are provided in this embodiment. In accordance with this embodiment, when the area of the top case tc1 is smaller than that of the bottom case bc1, a distance between a plurality of top cases, on which vibrations of a plurality of actuators are concentrated is sufficient even though the plurality of actuators are densely arranged. Hence, a resolution of vibrations that a user actually feels can be increased. Also, in this embodiment, one surface of the top case tc1 is configured in a circular shape, so that the user does not feel any corner, thereby providing more comfortable feeling.

The bottom case bc1 may include a protrusion part bm1, and the top case tc1 may include a recessed part tf1. The protrusion part bm1 of the bottom case bc1 is fitted into the recessed part tf1 while pressurizing the base band, so that the actuator ac1 and the actuator case bc1, cc1, and tc1 can be more firmly fixed to the base band. In this embodiment, since the area of the top case tc1 is relatively small, four pairs of the protrusion parts bm1 and the recessed parts tf1 are provided.

Embodiments of the following drawings are described using the actuator ac and the actuator case ttc and bbc, which are shown in FIGS. 1 and 2. However, those skilled in the art may implement each of the embodiments which will be described later by using the actuator ac1 and the actuator case tc1, cc1, and bc1, which are shown in FIGS. 3 and 4. Also, those skilled in the art may implement each of the embodiments which will be described later by using another type of actuator and another type of actuator case.

Figure 5:
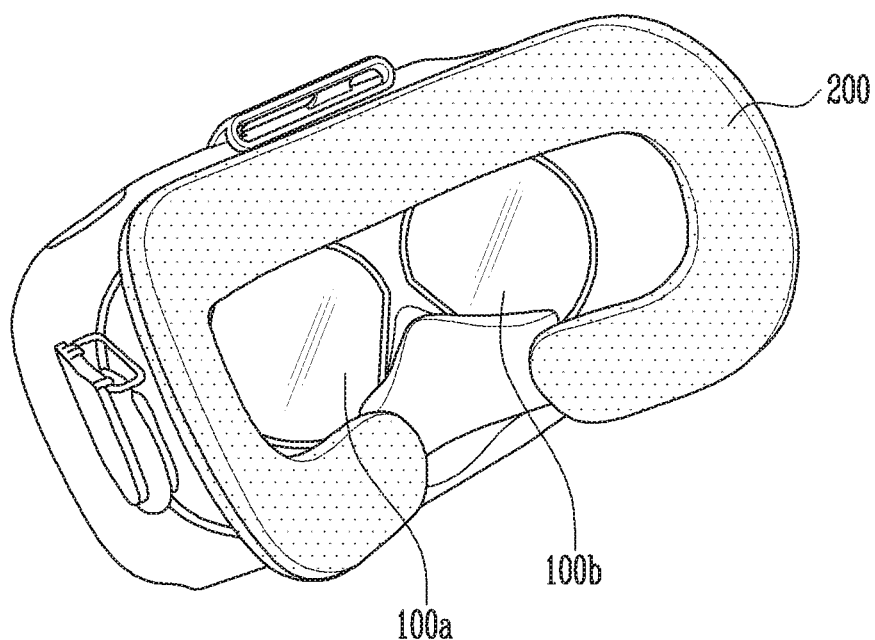
FIG. 5 is a view illustrating a structure of a head mounted display.

FIG. 5 is a view illustrating a structure of a head mounted display.

Referring to FIG. 5, the head mounted display 9 may include a display 100a and 100b and a buffer 200.

The display 100a and 100b may display an image. For example, a display 100a may display a left-eye image corresponding to a left eye of a user, and a display 100b may display a right-eye image corresponding to a right eye of the user.

The display 100a and 100b may further include an optical system configured as a lens, etc. The lens may be a magnifying lens for magnifying an image displayed in the display 100a and 100b. The magnifying lens may be a convex lens. In addition, the optical system selectively includes a lenticular lens, a parallax barrier, and a shutter member, so that the head mounted display 9 can provide a three-dimensional image to the user.

The buffer 200 may extend along an outer edge of the display 100a and 100b. For example, the buffer 200 may extend to surround the periphery of the display 100a and 100b, and be in contact with the face of the user. The buffer 200 may serve as a buffer such that a hard cover of the head mounted display 9 or the display 100a and 100b is not in direct contact with the face or eyeballs of the user. Accordingly, the buffer 200 may be made of a shock absorbing material such as sponge, rubber, or memory foam.

The head mounted display 9 may be configured to autonomously vibrate. However, such a way may causes motion sickness since the entire sight viewed by the user shakes, and interfere with continuous trace of the position and posture of the head mounted display 9 in a 3D space. In addition, such a way may have bad influence on the durability of the head mounted display 9 in which complicated optical and electronic devices are used.

Figure 6:
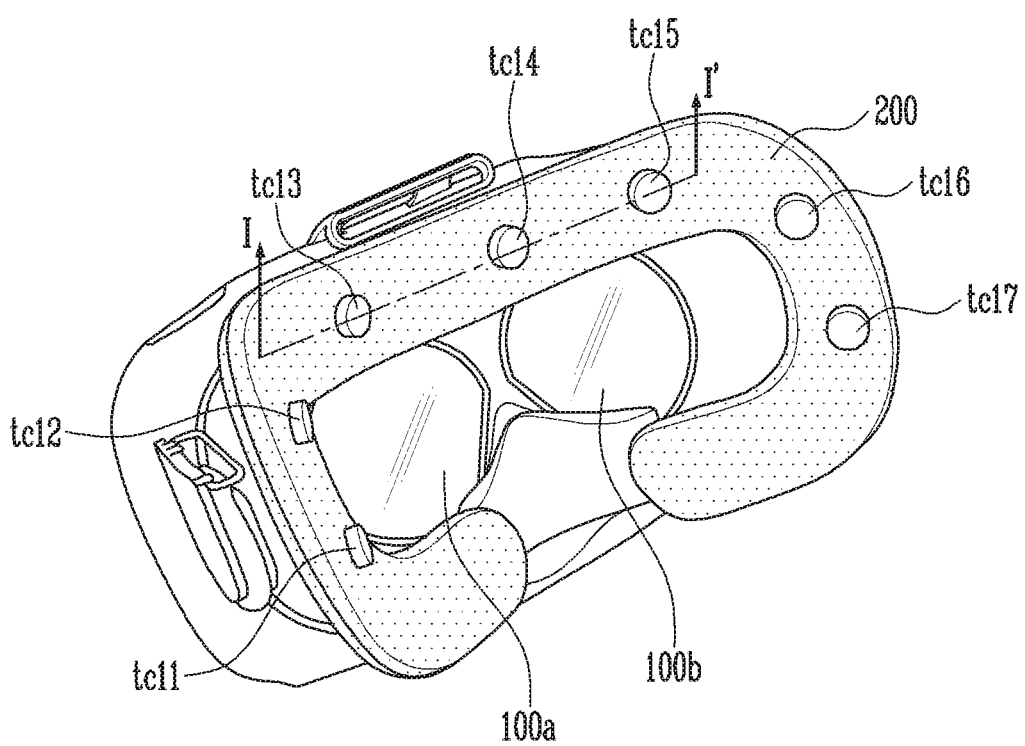
FIG. 6 is a view illustrating a head mounted display in accordance with a first embodiment of the present invention.
Figure 7:
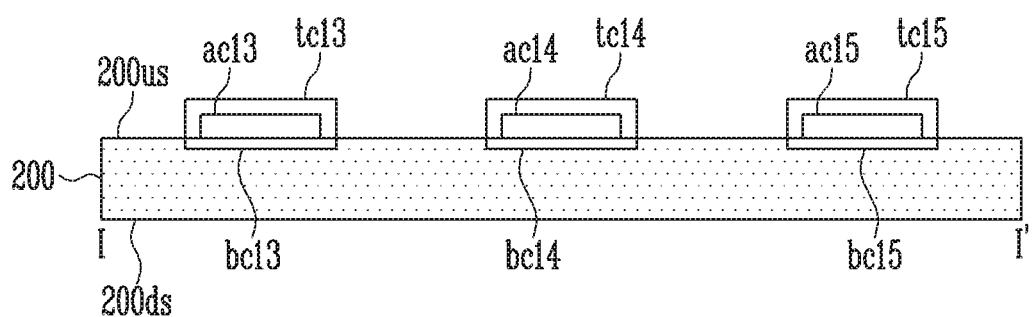
FIG. 7 is a sectional view illustrating an embodiment of the head mounted display shown in FIG. 6.
Figure 8:
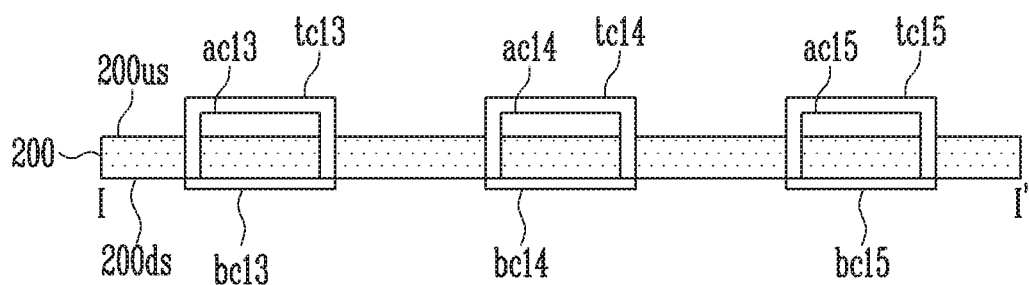
FIG. 8 is a sectional view illustrating another embodiment of the head mounted display shown in FIG. 6.

FIG. 6 is a view illustrating a head mounted display in accordance with a first embodiment of the present invention, FIG. 7 is a sectional view illustrating an embodiment of the head mounted display shown in FIG. 6, and FIG. 8 is a sectional view illustrating another embodiment of the head mounted display shown in FIG. 6.

Referring to FIG. 6, the head mounted display 11 in accordance with the first embodiment of the present invention may include a display 100a and 100b, a buffer 200, and a plurality of actuators ac13, ac14, ac15, . . . . Overlapping descriptions of the display 100a and 100b and the buffer 200 will be omitted.

The plurality of actuators ac13, ac14, ac15, . . . may be located along a direction in which the buffer 200 extends. The plurality of actuators ac13, ac14, ac15, . . . may be located on a front surface of the buffer 200.

A plurality of top cases tc11 to ct17 may be located on a front surface of a base band, and cover the plurality of actuators ac13, ac14, ac15, . . . .

A plurality of bottom cases bc13, bc14, bc15, . . . may be located on a rear surface of the base band, and be coupled to the plurality of top cases tc11 to ct17.

In the embodiment shown in FIG. 7, the base band may mean an upper skin layer 200us of the buffer 200. The plurality of top cases tc11 to ct17 and the plurality of actuators ac13, ac14, ac15, . . . may be located on a front surface of the upper skin layer 200us of the buffer 200. In addition, the plurality of bottom cases bc13, bc14, bc15, . . . may be located on a rear surface of the upper skin layer 200*us*, to be located at the inside of the buffer 200.

In the embodiment shown in FIG. 8, the base band may mean the buffer 200 itself. The plurality of top cases tc11 to ct17 and the plurality of actuators ac13, ac14, ac15, . . . may be located on the front surface of the upper skin layer 200*us* of the buffer 200. In addition, the plurality of bottom cases bc13, bc14, bc15, . . . may be located on a rear surface of a lower skin layer 200*ds*.

In the first embodiment, since the plurality of top cases tc11 to ct17 are located on the top of the buffer 200, the face of a user and the plurality of top cases tc11 to tc17 are adhered closely to each other, when the user wears the head mounted display 11.

Thus, the user can feel vibrations generated by the plurality of actuators ac13, ac14, ac15, . . . through the plurality of top cases tc11 to tc17, and accordingly, a tactile stimulation can be provided to the user.

Figure 9:
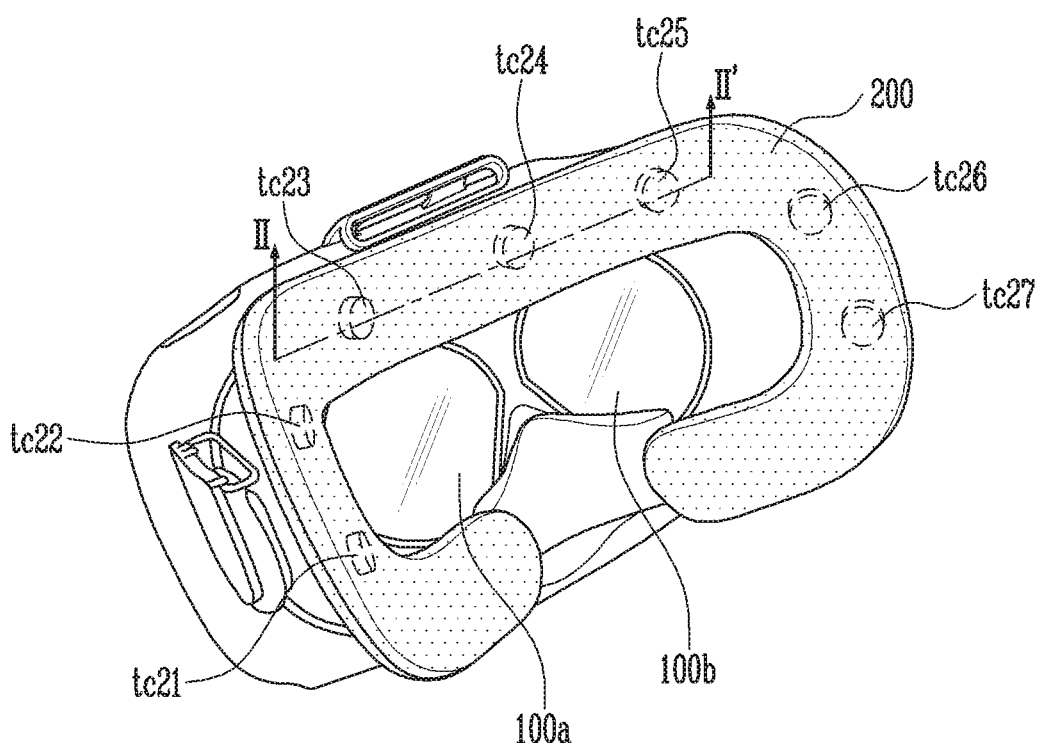
FIG. 9 is a view illustrating a head mounted display in accordance with a second embodiment of the present invention.
Figure 10:
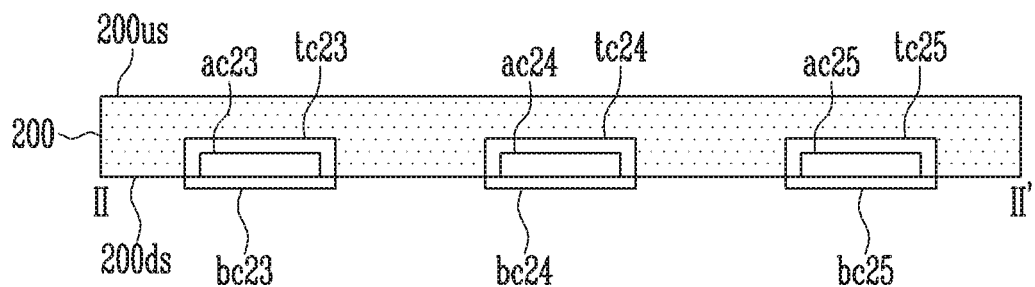
FIG. 10 is a sectional view illustrating an embodiment of the head mounted display shown in FIG. 9.
Figure 11:
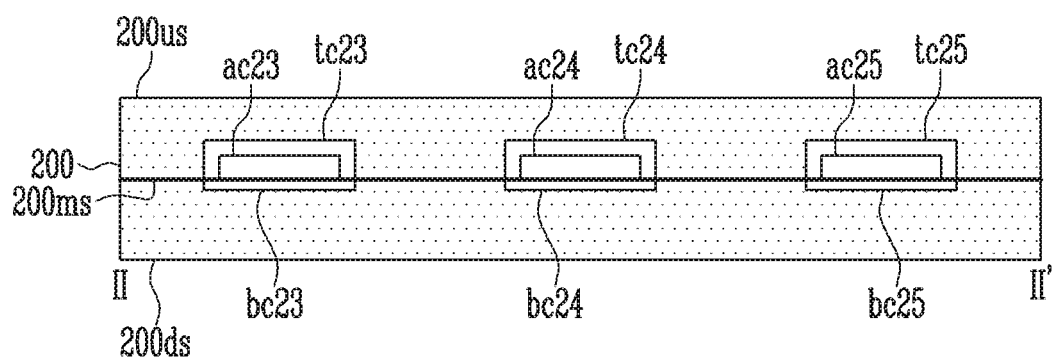
FIG. 11 is a sectional view illustrating another embodiment of the head mounted display shown in FIG. 9.

FIG. 9 is a view illustrating a head mounted display in accordance with a second embodiment of the present invention, FIG. 10 is a sectional view illustrating an embodiment of the head mounted display shown in FIG. 9, and FIG. 11 is a sectional view illustrating another embodiment of the head mounted display shown in FIG. 9.

Referring to FIG. 9, the head mounted display 12 in accordance with the second embodiment of the present invention may include a display 100*a* and 100*b*, a buffer 200, and a plurality of actuators ac23, ac24, ac25, . . . . Overlapping descriptions of the display 100*a* and 100*b* and the buffer 200 will be omitted.

The plurality of actuators ac23, ac24, ac25, . . . may be located along a direction in which the buffer 200 extends. The plurality of actuators ac23, ac24, ac25, . . . may be located at the inside of the buffer 200.

A plurality of top cases tc21, tc22, tc23, tc24, tc25, tc26, and tc27 may be located at the inside of the buffer 200, and cover the plurality of actuators ac23, ac24, ac25, . . . .

A plurality of bottom cases bc23, bc24, bc25, . . . may be coupled to the plurality of top cases tc21 to tc27 to allow the plurality of actuators ac23, ac24, ac25, . . . to be fixed to the buffer 200.

In the embodiment shown in FIG. 10, a base band may mean a lower skin layer 200*ds*. The plurality of top cases tc21 to tc27 and the plurality of actuators ac23, ac24, ac25, . . . may be located on a front surface of the lower skin layer 200*ds*. In addition, the plurality of bottom cases bc23, bc24, bc25, . . . may be located on a rear surface of the lower skin layer 200*ds* of the buffer 200.

In the embodiment shown in FIG. 11, the base band may mean a middle skin layer 200*ms*. The plurality of top cases tc21 to tc27 and the plurality of actuators ac23, ac24, ac25, . . . may be located on a front surface of the middle skin layer 200*ms*. In addition, the plurality of bottom cases bc23, bc24, bc25, . . . may be located on a rear surface of the middle skin layer 200*ms*.

In the second embodiment, since the plurality of top cases tc21 to tc27 are located at the inside of the buffer 200, the face of a user and the plurality of top cases tc21, tc22, tc23, tc24, tc25, tc26, and tc27 are not in direct contact with each other, even when the user wears the head mounted display 12.

Thus, the user can feel vibrations generated by the plurality of actuators ac23, ac24, ac25, . . . through the plurality of top cases tc21, tc22, tc23, tc24, tc25, tc26, and tc27 and an upper skin layer 200*us* of the buffer 200.

Figure 12:
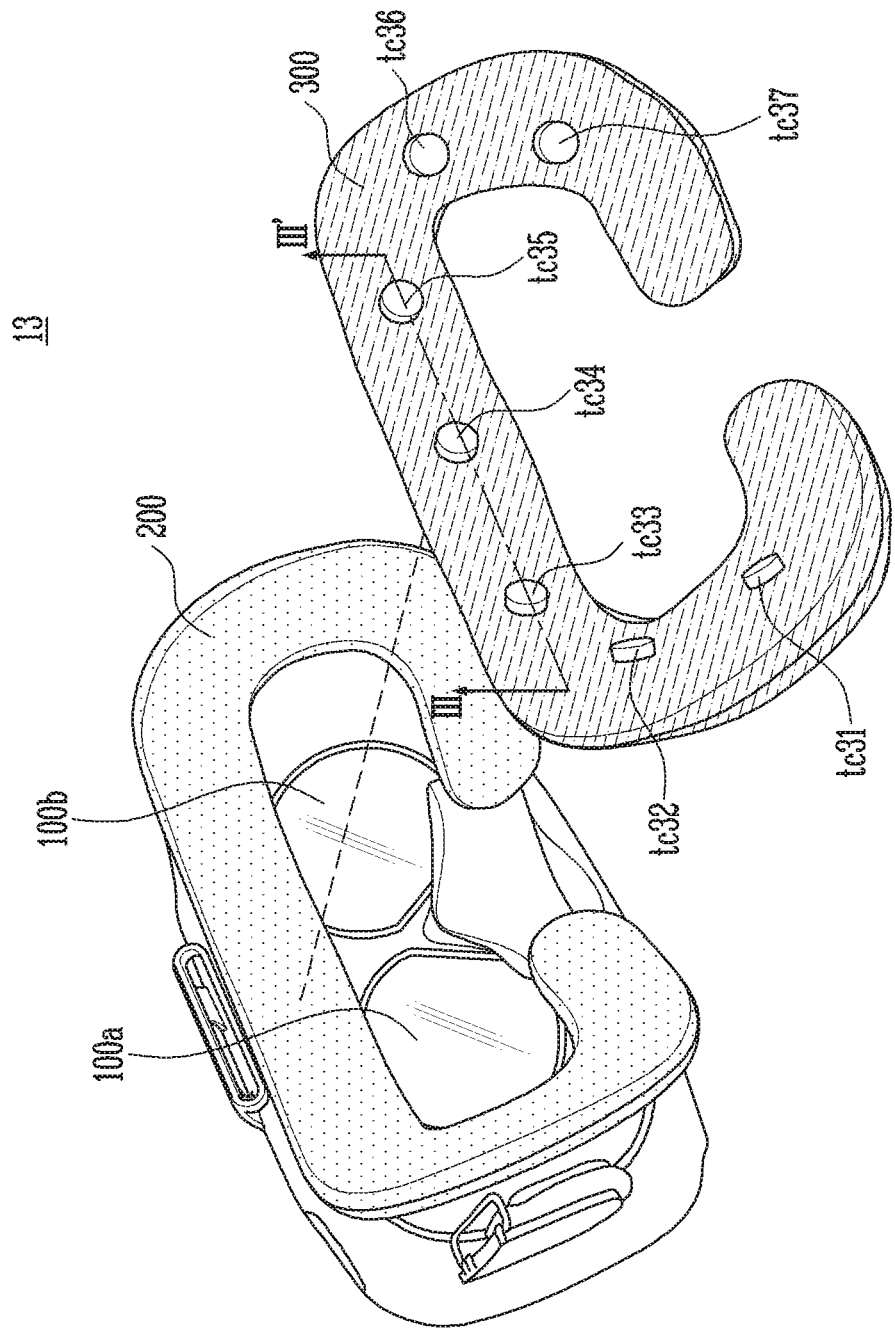
FIG. 12 is a view illustrating a head mounted display in accordance with a third embodiment of the present invention.
Figure 13:
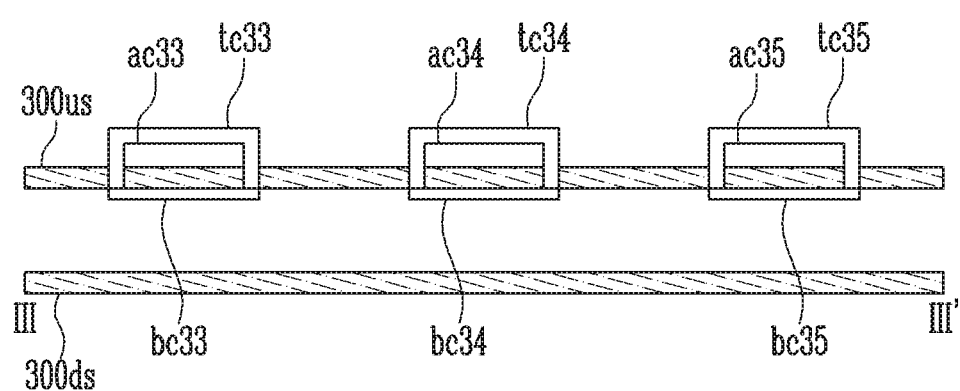
FIG. 13 is a sectional view illustrating an embodiment of the head mounted display shown in FIG. 12.

FIG. 12 is a view illustrating a head mounted display in accordance with a third embodiment of the present invention and FIG. 13 is a sectional view illustrating an embodiment of the head mounted display shown in FIG. 12.

Referring to FIG. 12, the head mounted display 13 in accordance with the third embodiment of the present invention may include a display 100*a* and 100*b*, a buffer 200, and a plurality of actuators ac33, ac34, ac35, . . . , and further include a buffer cover 300. Overlapping descriptions of the display 100*a* and 100*b* and the buffer 200 will be omitted.

The buffer cover 300 may support the plurality of actuators ac33, ac34, ac35, . . . , and cover the buffer 200. The buffer cover 300 is a component for preventing contamination of the buffer 200, and may cover the buffer 200. The buffer cover 300 may be made of a flexible material such as cloth, cotton, rubber, silicon, or urethane. The buffer cover 300 may have a form in which two or more layers 300*us* and 300*ds* are sewed. The buffer 200 may be interposed between an upper skin layer 300*us* and a lower skin layer 300*ds*. In the third embodiment, the upper skin layer 300*us* of the buffer cover 300 may serve as a base band.

A plurality of top cases tc31, tc32, tc33, tc34, tc35, tc36, and tc37 may be located on a front surface of the buffer cover 300, and cover the plurality of actuators ac33, ac34, ac35, . . . . For example, the plurality of top cases tc31 to tc37 and the plurality of actuators ac33, ac34, ac35, . . . may be located on a front surface of the upper skin layer 300*us*.

A plurality of bottom cases bc33, bc34, bc35, . . . may be coupled to the plurality of top cases tc31 to tc37 to allow the plurality of actuators ac33, ac34, ac35, . . . to be fixed to the buffer cover 300. For example, the plurality of bottom cases bc33, bc34, bc35, may be located on a rear surface of the upper skin layer 300*us*.

When a user wears the head mounted display 13 in which the buffer 200 is covered by the buffer cover 300, the face of the user and the plurality of top cases tc31 to tc37 are adhered closely to each other.

Thus, the user can feel vibrations generated by the plurality of actuators ac33, ac34, ac35, . . . through the plurality of top cases tc31 to tc37, and accordingly, a tactile stimulation can be provided to the user.

Figure 14:
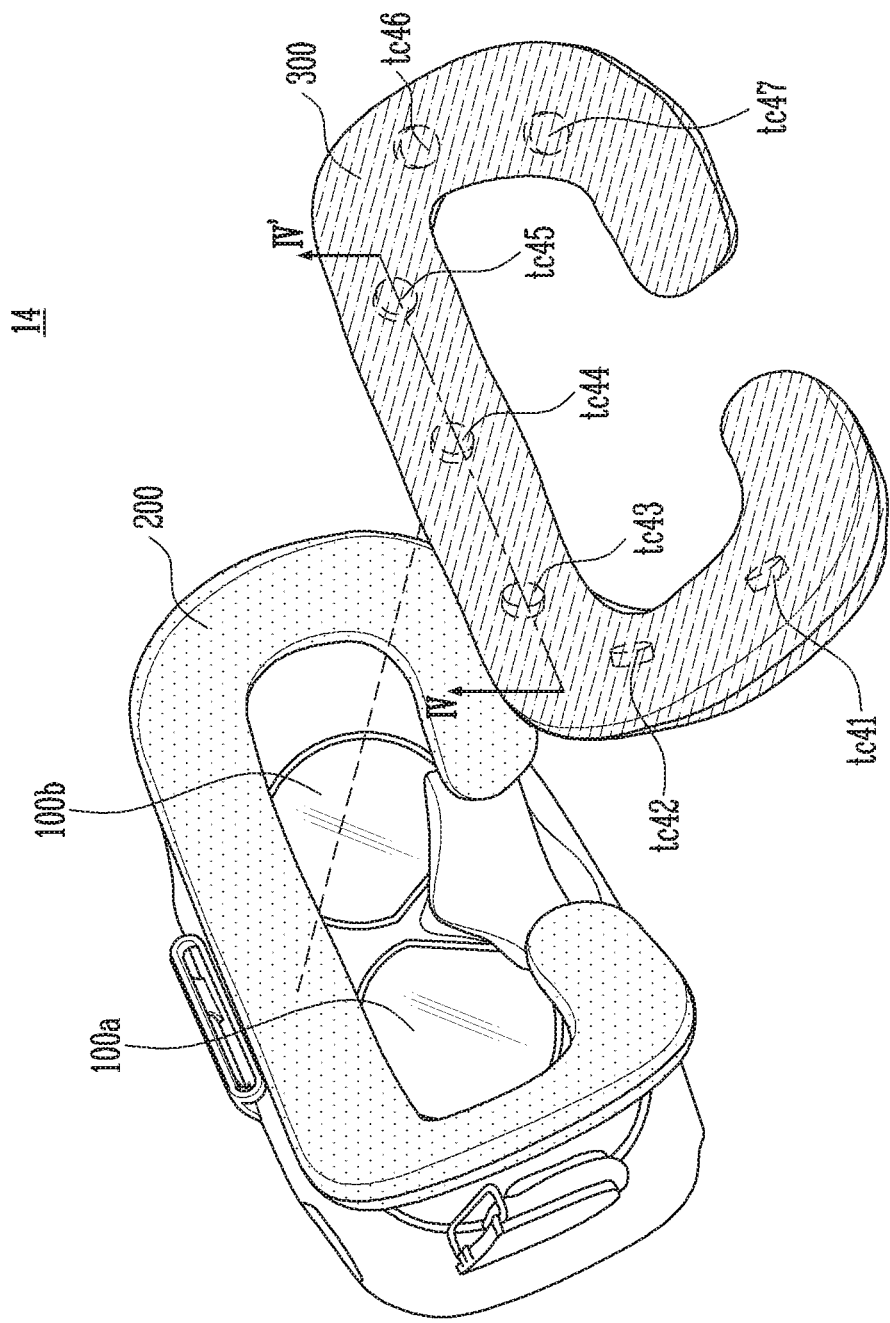
FIG. 14 is a view illustrating a head mounted display in accordance with a fourth embodiment of the present invention.
Figure 15:
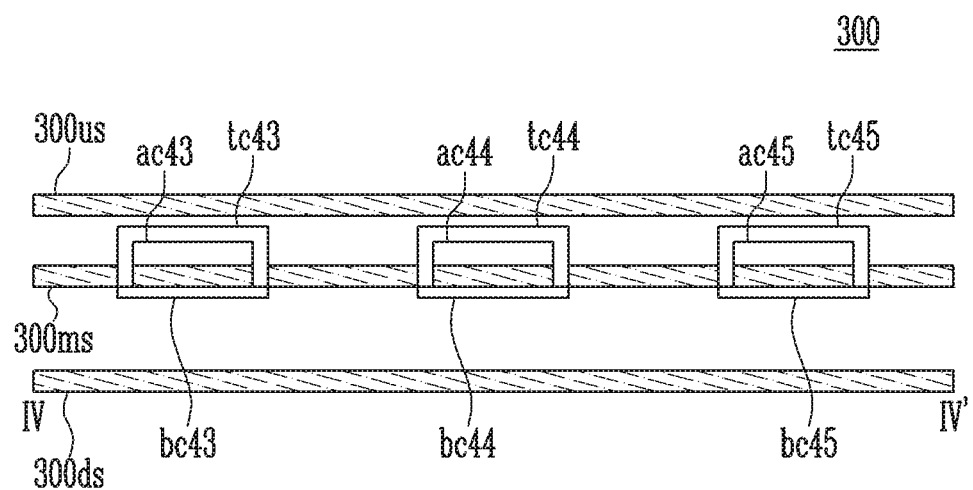
FIG. 15 is a sectional view illustrating an embodiment of the head mounted display shown in FIG. 14.

FIG. 14 is a view illustrating a head mounted display in accordance with a fourth embodiment of the present invention and FIG. 15 is a sectional view illustrating an embodiment of the head mounted display shown in FIG. 14.

Referring to FIG. 14, the head mounted display 14 in accordance with the fourth embodiment of the present invention may include a display 100*a* and 100*b*, a buffer 200, and a plurality of actuators ac43, ac44, ac45, . . . , and further include a buffer cover 300. Overlapping descriptions of the display 100*a* and 100*b*, the buffer 200, and the buffer cover 300 will be omitted. However, in the fourth embodiment, the buffer cover 300 may have a form in which three or more layers 300*us*, 300*ms*, and 300*ds* are sewed. The buffer 200 may be interposed between a middle skin layer 300*ms* and a lower skin layer 300*ds*. In the fourth embodiment, the middle skin layer 300*ms* of the buffer cover 300 may serve as a base band.

A plurality of top cases tc41, tc42, tc43, tc44, tc45, tc46, and tc47 may be located at the inside of the buffer cover 300, and cover the plurality of actuators ac43, ac44, ac45, . . . . For example, the plurality of top cases tc41 to tc47 and the plurality of actuators ac43, ac44, ac45, . . . may be located on a front surface of the middle skin layer 300*ms*.

A plurality of bottom cases bc43, bc44, bc45, . . . may be coupled to the plurality of top cases tc41 to tc47 to allow the plurality of actuators ac43, ac44, ac45, . . . to be fixed to the buffer cover 300. For example, the plurality of bottom cases bc43, bc44, bc45, . . . may be located on a rear surface of the middle skin layer 300ms.

When a user wears the head mounted display 14 in which the buffer 200 is covered by the buffer cover 300, the face of the user and the plurality of top cases tc41 to tc47 are adhered closely to each other with the buffer cover 300 interposed therebetween.

Figure 16:
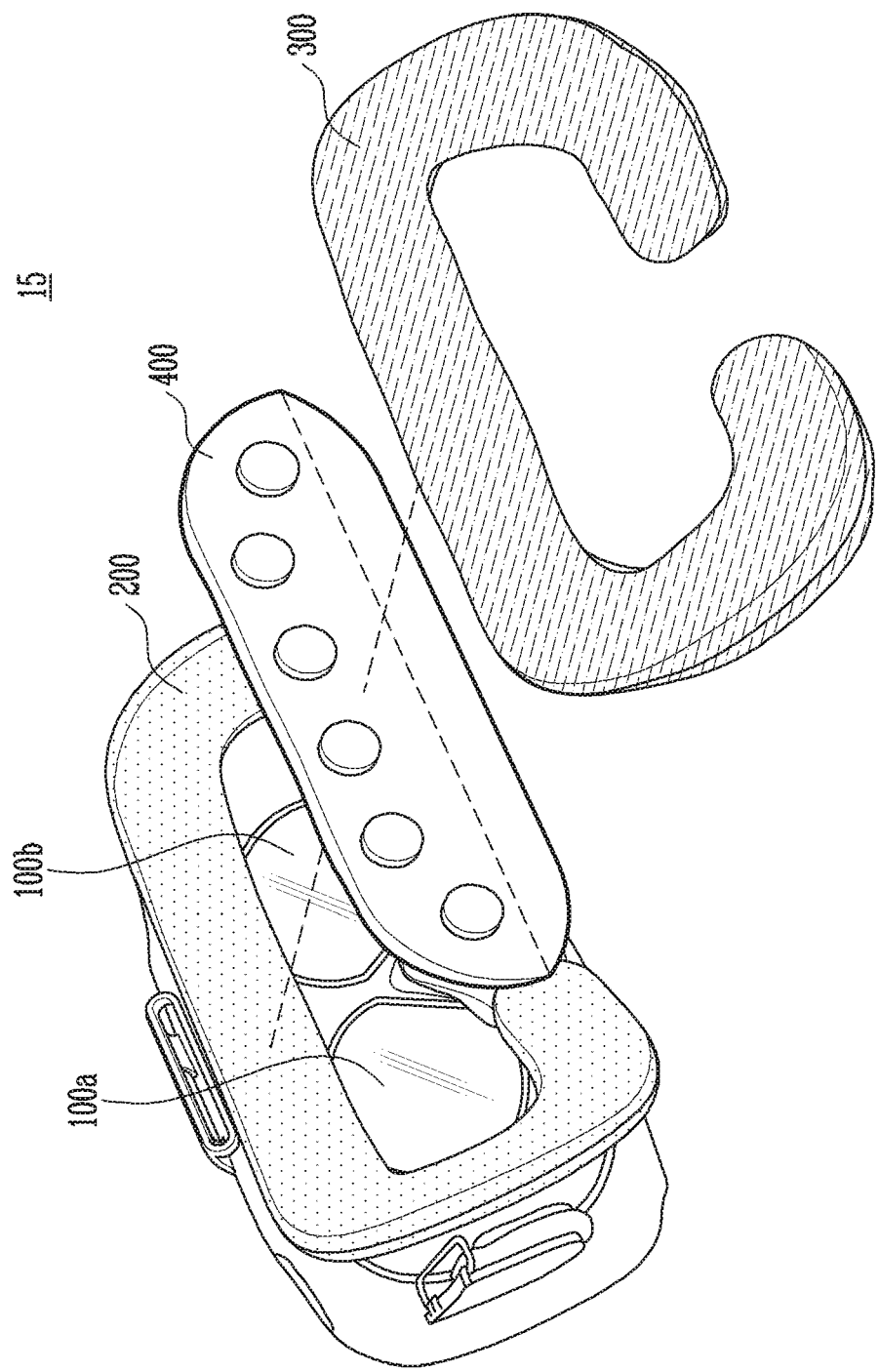
FIG. 16 is a view illustrating a head mounted display in accordance with a fifth embodiment of the present invention.
Figure 17:
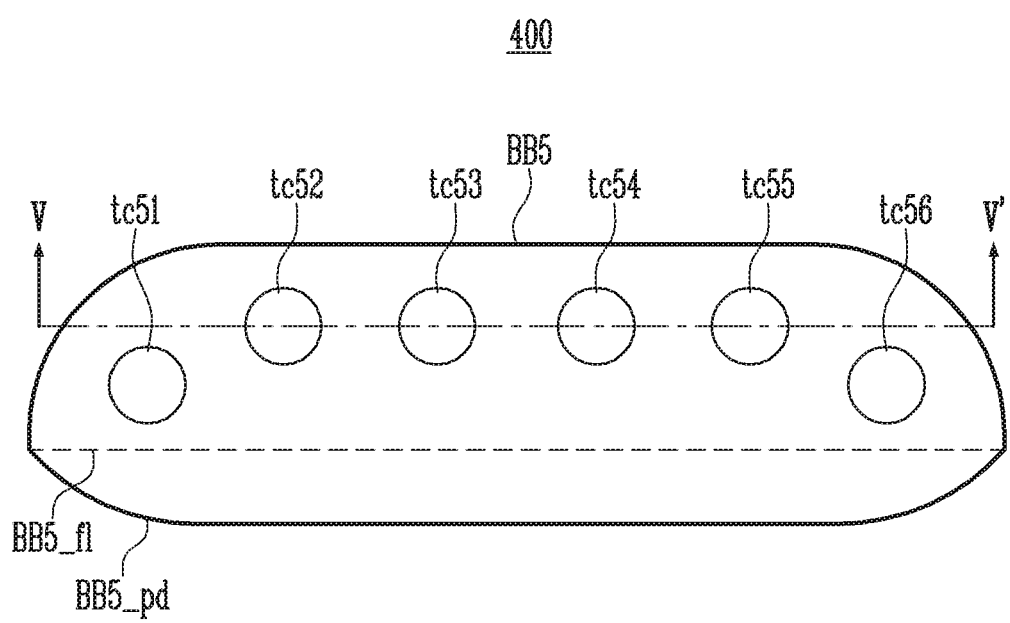
FIG. 17 is a view illustrating a front surface of an actuator supporting cover of the head mounted display shown in FIG. 16 in accordance with an embodiment.
Figure 18:
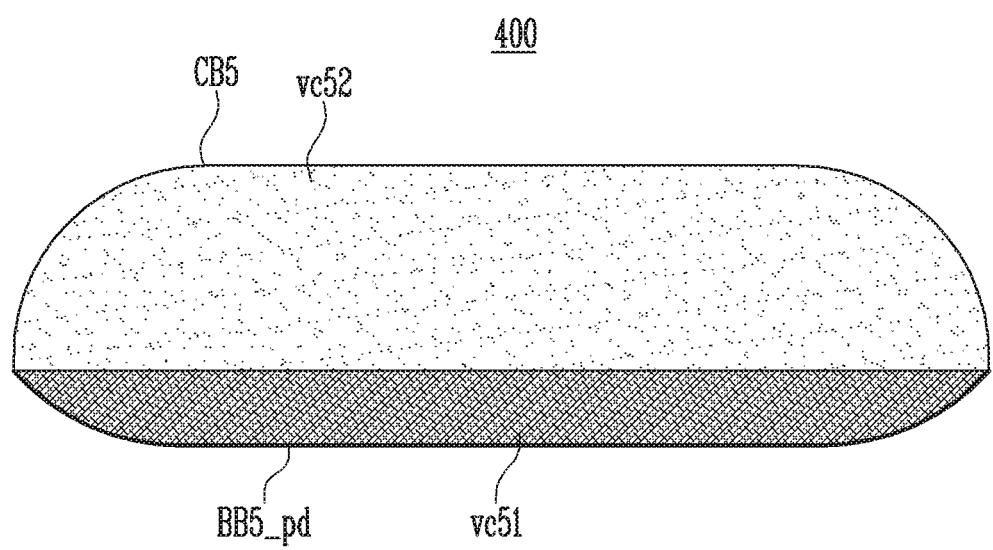
FIG. 18 is a view illustrating a rear surface of the actuator supporting cover shown in FIG. 17.
Figure 19:
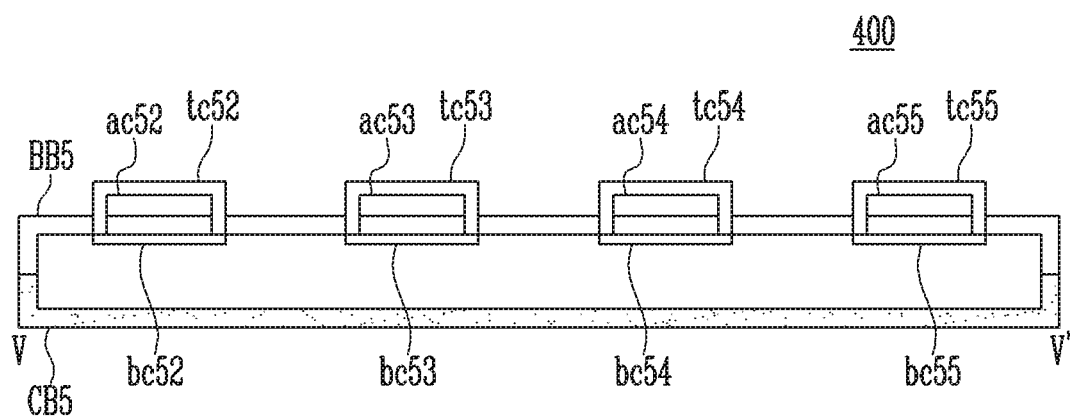
FIG. 19 is a sectional view illustrating an embodiment of the actuator supporting cover shown in FIG. 17.

FIG. 16 is a view illustrating a head mounted display in accordance with a fifth embodiment of the present invention, FIG. 17 is a view illustrating a front surface of an actuator supporting cover of the head mounted display shown in FIG. 16 in accordance with an embodiment, FIG. 18 is a view illustrating a rear surface of the actuator supporting cover shown in FIG. 17, and FIG. 19 is a sectional view illustrating an embodiment of the actuator supporting cover shown in FIG. 17.

The head mounted display 15 in accordance with the fifth embodiment of the present invention may include a display 100a and 100b, a buffer 200, and a plurality of actuators ac52, ac53, ac54, . . . , and further include an actuator supporting cover 400. In some embodiments, the head mounted display 15 may further include a buffer cover 300. Overlapping descriptions of the display 100a and 100b, the buffer 200, and the buffer cover 300 will be omitted.

The actuator supporting cover 400 may support the plurality of actuators ac52, ac53, ac54, . . . . The actuator supporting cover 400 may include a base band BB5 and an auxiliary band CB5, and the plurality of actuators ac52, ac53, ac54, . . . may be located at the base band BB5. The base band BB5 and the auxiliary band CB5 of the actuator supporting cover 400 may be made of a flexible material such as cloth, cotton, rubber, urethane, or silicon.

The plurality of actuators ac52, ac53, ac54, . . . may be located on a front surface of the base band BB5. A plurality of top cases tc51, tc52, tc53, tc54, tc55, and tc56 may be located on the front surface of the base band BB5, and cover the plurality of actuators ac52, ac53, ac54, . . . . A plurality of bottom cases bc52, bc53, bc54, bc55, . . . may be located on a rear surface of the base band BB5, and be coupled to the plurality of top cases tc51 to tc56.

The auxiliary band CB5 may be located to overlap with a region in which the plurality of actuators ac52, ac53, ac54, . . . are located among regions of the base band BB5, a partial outer edge of the auxiliary band CB5 may be sewed with that of the base band BB5. The partial outer edge and the other outer edge may be distinguished based on a folding line BB5_fl. The partial outer edge may mean an upper part of the folding line BB5_fl.

The actuator supporting cover 400 may cover at least a portion of the buffer 200. For example, at least a portion of the buffer 200 may be interposed between the base band BB5 and the auxiliary band CB5. For example, at least a portion of the buffer 200 may be a portion corresponding to a forehead or eyebrow of a user.

The base band BB5 may include a protrusion part BB5_pd that does not overlap with the auxiliary band CB5. A first detachable member vc51 may be located on a rear surface of the protruding part BB5_pd. A second detachable member vc52 may be located on a rear surface of the auxiliary band CB5. Alternatively, the auxiliary band CB5 may be the second detachable member vc52. The second detachable member vc52 may be detachable from the first detachable member vc51.

For example, the first detachable member vc51 may be a detachable member of type A, and the second detachable member vc52 may be a detachable member of type B. The type A and the type B may be detachable from each other. However, the type A and the type A may not be detachable from each other. Similarly, the type B and the type B may not be detachable from each other. All kinds of detachable members having these types may be used as the detachable member of this embodiment. Examples of the detachable member may be Velcro, a magnet, an electromagnet, a snap button, buckle, and the like. A case where the detachable member is Velcro is assumed and illustrated in drawings of the following embodiments.

A user first inserts at least a portion of the buffer 200 between the base band BB5 and the auxiliary band CB5 of the actuator supporting cover 400, and then folds the protruding part BB5_pd toward the auxiliary band CB5 along the folding line BB5_fl, so that the first detachable member vc51 and the second detachable member vc52 can be attached to each other. Accordingly, the actuator supporting cover 400 can be fixed to the buffer 200.

The buffer cover 300 may cover the actuator supporting cover 400 and the buffer 200. For example, the buffer cover 300 may simultaneously cover the buffer 200 and the actuator supporting cover 400, after the actuator supporting cover 400 is fixed to the buffer 200. Thus, when only actuator supporting cover 400 is replaced or washed according to some users, a majority of users can share the head mounted display 15 without displeasure.

In accordance with an embodiment, the buffer cover 300 may include a cushion layer therein. Thus, the plurality of top cases tc51 to tc56 that a user may feel hard are in contact with the face of the user through the cushion layer and the buffer cover 300, so that the user can feel more comfortable wearing sensation.

Figure 20:
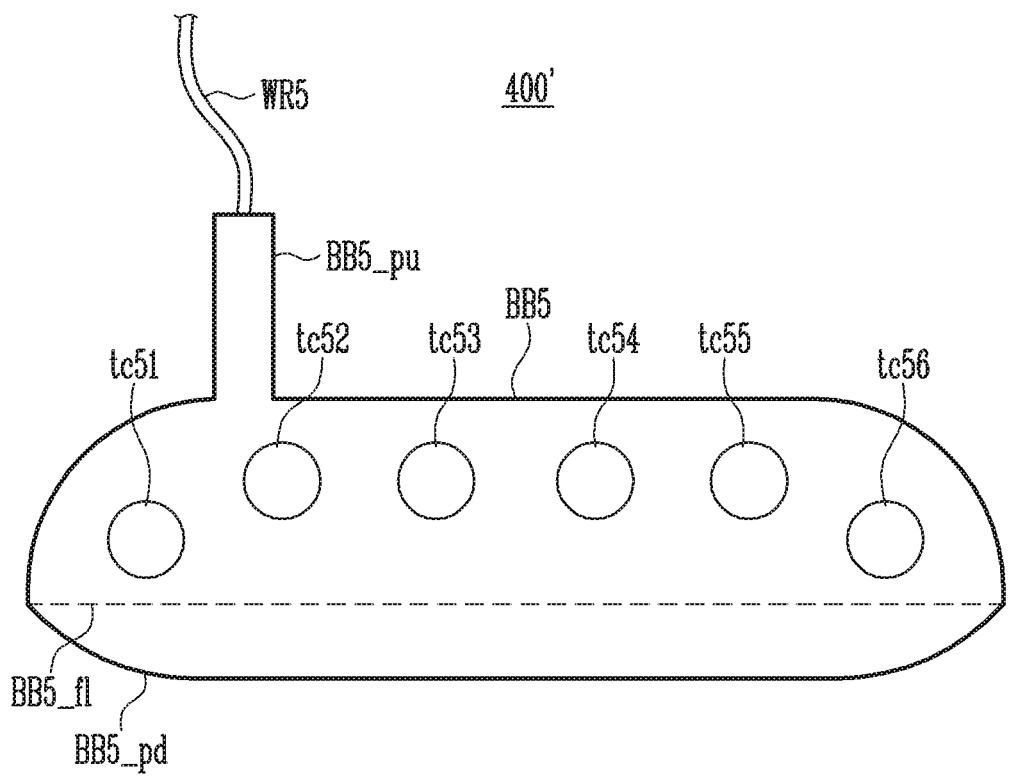
FIG. 20 is a view illustrating a front surface of an actuator supporting cover in accordance with another embodiment.
Figure 21:
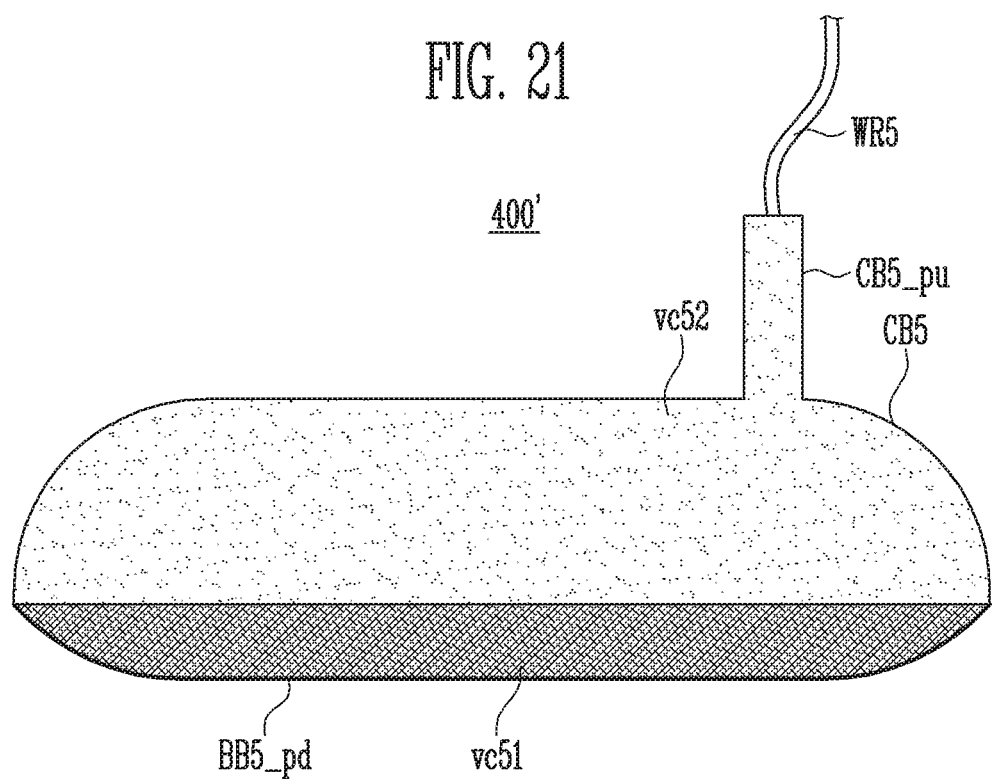
FIG. 21 is a view illustrating a rear surface of the actuator supporting cover shown in FIG. 20.

FIG. 20 is a view illustrating a front surface of an actuator supporting cover in accordance with another embodiment and FIG. 21 is a view illustrating a rear surface of the actuator supporting cover shown in FIG. 20.

Referring to FIGS. 20 and 21, the base band BB5 of the actuator supporting cover 400' may further include an upper protrusion part BB5_pu. The auxiliary band CB5 may further include an upper protrusion part CB5_pu. The upper protrusion part BB5_pu of the base band BB5 and the upper protrusion part CB5_pu of the auxiliary band CB5 may overlap with each other such that at least a partial outer edge of the base band BB5 is sewed with that of the auxiliary band CB5.

A line WR5 may be extracted through a portion at the upper protrusion parts BB5_pu and CB5_pu are not sewed. The line WR5 may electrically connect the plurality of actuators acS2, acS3, acS4, . . . to a controller (not shown). For example, the actuator supporting cover 400' may include a sub-PCB connected to each of the plurality of actuators ac52, ac53, ac54, . . . through a line and/or a FPCB. The controller may transmit a control signal to the sub-PCB through the line WR5, and the sub-PCB may finally driver the plurality of actuators ac52, ac53, ac54, . . . , corresponding to the control signal. In addition, desired driving power may be supplied to the plurality of actuators ac52, ac53, ac54, . . . through the line WR5. The driving power may be supplied from a separate battery or be supplied from the head mounted display 15. Thus, it is unnecessary for the actuator supporting cover 400' to accommodate the battery, the controller, etc., so that space efficiency can be improved.

Other components of the actuator supporting cover 400' are identical to those of the actuator supporting cover 400, and therefore, overlapping descriptions will be omitted.

Although the present invention has been described with reference to exemplary embodiments illustrated in the drawings for illustrative purposes, those skilled in the art will appreciate that various modifications and equivalent embodiments are possible, without departing from the scope and spirit of the invention. Accordingly, the substantial technical protection scope of the present invention will be defined by the appended claims.

The invention claimed is:

1. A head mounted display comprising:
a display capable of displaying an image;
a buffer extending along an outer edge of the display;
a plurality of actuators located along a direction in which the buffer extends; and
an actuator supporting cover supporting the plurality of actuators, the actuator supporting cover covering a portion of the buffer,
wherein the actuator supporting cover includes:
a base band at which the plurality of actuators are located; and
an auxiliary band located to overlap with a region in which the plurality of actuators are located among regions of the base band, wherein a portion of outer edge thereof is connected to the base band, and
wherein the actuator supporting cover is separated from the buffer but is configured to be fixed to the buffer by inserting the portion of the buffer between the base band and the auxiliary band.

2. The head mounted display of claim 1,
wherein the head mounted display further comprises:
a plurality of top cases covering the plurality of actuators; and
a plurality of bottom cases coupled to the plurality of top cases to allow the plurality of actuators to be fixed to the actuator supporting cover.

3. A head mounted display comprising:
a display capable of displaying an image;
a buffer extending along an outer edge of the display;
a plurality of actuators located along a direction in which the buffer extends; and
an actuator supporting cover supporting the plurality of actuators, the actuator supporting cover covering at least a portion of the buffer,
wherein the actuator supporting cover includes:
a base band at which the plurality of actuators are located; and
an auxiliary band located to overlap with a region in which the plurality of actuators are located among regions of the base band, wherein a portion of outer edge thereof is connected to the base band,
wherein the base band includes a protrusion part that does not overlap with the auxiliary band, and
wherein the head mounted display further comprises:
a first detachable member located on a rear surface of the protrusion part; and
a second detachable member located on a rear surface of the auxiliary band, the second detachable member being detachable from the first detachable member.

4. The head mounted display of claim 3, wherein the plurality of actuators are located to a front surface of the base band,
wherein the head mounted display further comprises:
a plurality of top cases located on the front surface of the base band, the plurality of top cases covering the plurality of actuators; and
a plurality of bottom cases located on a rear surface of the base band, the plurality of bottom cases being coupled to the plurality of top cases.

5. A head mounted display comprising:
a display capable of displaying an image;
a buffer extending along an outer edge of the display;
a plurality of actuators located along a direction in which the buffer extends; and
a buffer cover supporting the plurality of actuators, the buffer cover covering the buffer,
wherein the plurality of actuators are located on a front surface of the buffer cover or at an inside of the buffer cover, and
wherein the head mounted display further comprises:
a plurality of top cases covering the plurality of actuators; and
a plurality of bottom cases coupled to the plurality of top cases to allow the plurality of actuators to be fixed to the buffer cover.

* * * * *